us008237312B2

(12) United States Patent
Schrieber et al.

(10) Patent No.: US 8,237,312 B2
(45) Date of Patent: Aug. 7, 2012

(54) ELECTROCHEMICAL CELL SYSTEM HAVING A DUAL FUNCTION DC-TO-DC CONVERTER

(75) Inventors: Jeffrey W. Schrieber, Troy, NY (US); David Robertson, Ancramdale, NY (US)

(73) Assignee: Honda Motor Co., Ltd., Tokyo (JP)

( * ) Notice: Subject to any disclaimer, the term of this patent is extended or adjusted under 35 U.S.C. 154(b) by 989 days.

(21) Appl. No.: 11/985,042

(22) Filed: Nov. 13, 2007

(65) Prior Publication Data

US 2009/0123783 A1    May 14, 2009

(51) Int. Cl.
*G06F 13/40* (2006.01)

(52) U.S. Cl. .......................... 307/134; 307/139; 429/400

(58) Field of Classification Search .................... 429/50, 429/51, 428, 452, 410, 411, 412, 400; 307/9.1, 307/10.1, 19, 20, 21, 28, 134, 139
See application file for complete search history.

(56) References Cited

U.S. PATENT DOCUMENTS

| | | | |
|---|---|---|---|
| 4,818,638 A * | 4/1989 | Roy ............................... | 429/421 |
| 4,839,247 A * | 6/1989 | Levy et al. .................... | 429/422 |
| 7,344,629 B2 * | 3/2008 | Holmes et al. ................ | 204/536 |
| 7,736,771 B2 * | 6/2010 | Sullivan ........................... | 429/3 |
| 2006/0029846 A1 * | 2/2006 | Konoto et al. .................. | 429/23 |
| 2007/0132425 A1 * | 6/2007 | Gjini et al. .................... | 320/101 |
| 2007/0254195 A1 * | 11/2007 | Ballantine et al. ............. | 429/21 |

OTHER PUBLICATIONS

Harfman-Todorovic, M.; Palma, L.; Enjeti, P.; , "A Hybrid DC-DC Converter for Fuel Cells Powered Laptop Computers," Power Electronics Specialists Conference, 2006. PESC '06. 37th IEEE , vol., No., pp. 1-5, Jun. 18-22, 2006.*
ChangGyu Yoo; Woo-Cheol Lee; Kyu-Chan Lee; Cho, B.H.; , "Transient current suppression scheme for bi-directional DC-DC converters in 42 V automotive power systems," Applied Power Electronics Conference and Exposition, 2005. APEC 2005. Twentieth Annual IEEE , vol. 3, No., pp. 1600-1604 vol. 3, Mar. 6-10, 2005.*

* cited by examiner

*Primary Examiner* — Daniel Cavallari
(74) *Attorney, Agent, or Firm* — Nelson Mullins Riley & Scarborough LLP; Anthony A. Laurentano

(57) ABSTRACT

A technique includes operating a converter to convert a first voltage produced by an electrochemical cell stack in a power producing mode into a second voltage. The technique includes operating the converter to convert a third voltage into a fourth voltage to drive the electrochemical cell stack in a pumping mode.

15 Claims, 6 Drawing Sheets

ELECTROCHEMICAL CELL SYSTEM HAVING A DUAL FUNCTION DC-TO-DC CONVERTER

BACKGROUND

The invention generally relates to an electrochemical cell system having a dual function DC-to-DC converter.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 50° Celsius (C) to 75° C. temperature range. Another type employs a phosphoric-acid-based polybenziamidazole, PBI, membrane that operates in the 150° to 200° temperature range. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

Anode: $H_2 \rightarrow 2H^+ + 2e^-$      Equation 1

Cathode: $O_2 + 4H^+ + 4e^- \rightarrow 2H_2O$      Equation 2

The PEM fuel cell is only one type of fuel cell. Other types of fuel cells include direct methanol, alkaline, phosphoric acid, molten carbonate and solid oxide fuel cells.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one cell of the stack. The plates may include various surface flow channels and orifices to, as examples, route the reactants and products through the fuel cell stack. Electrically conductive gas diffusion layers (GDLs) may be located on each side of a catalyzed PEM to form the anode and cathodes of each fuel cell. In this manner, reactant gases from both the anode and cathode flow-fields may diffuse through the GDLs to reach the catalyst layers.

In general, a fuel cell is an electrochemical cell that operates in a forward mode to produce power. However, the electrochemical cell may be operated in a reverse mode in which the cell produces hydrogen and oxygen from electricity and water. More specifically, an electrolyzer splits water into hydrogen and oxygen with the following reactions occurring at the anode and cathode, respectively:

Anode: $2H_2O \rightarrow O_2 + 4H^+ + 4e^-$      Equation 3

Cathode: $4H^+ + 4e^- \rightarrow 2H_2$      Equation 4

An electrochemical cell may also be operated as an electrochemical pump. For example, the electrochemical cell may be operated as a hydrogen pump, a device that produces a relatively pure hydrogen flow at a cathode exhaust of the cell relative to an incoming reformate flow that is received at an anode inlet of the cell. In general, when operated as an electrochemical pump, the cell has the same overall topology of the fuel cell. In this regard, similar to a fuel cell an electrochemical cell that operates as a hydrogen pump may contain a PEM, gas diffusion layers (GDLs) and flow plates that establish plenum passageways and flow fields for communicating reactants to the cell. However, unlike the arrangement for the fuel cell, the electrochemical pump cell receives an applied voltage, and in response to the received current, hydrogen migrates from the anode chamber of the cell to the cathode chamber of the cell to produce hydrogen gas in the cathode chamber. A hydrogen pump may contain several such cells that are arranged in a stack.

SUMMARY

In an embodiment of the invention, a technique includes operating a converter to convert a first voltage produced by an electrochemical cell stack in a power producing mode into a second voltage. The technique includes operating the converter to convert a third voltage into a fourth voltage to drive the electrochemical cell stack in a pumping mode.

In another embodiment of the invention, a system includes an electrochemical cell stack, a converter and a control subsystem. The converter is coupled to the electrochemical cell stack. The control subsystem is adapted to configure the converter to convert a first voltage that is produced by the electrochemical cell stack in a power producing mode into a second voltage. The control subsystem is also adapted to configure the converter to convert a third voltage into a fourth voltage to drive the electrochemical cell stack in a pumping mode.

Advantages and other features of the invention will become apparent from the following drawing, description and claims.

DETAILED DESCRIPTION

Figure 1:
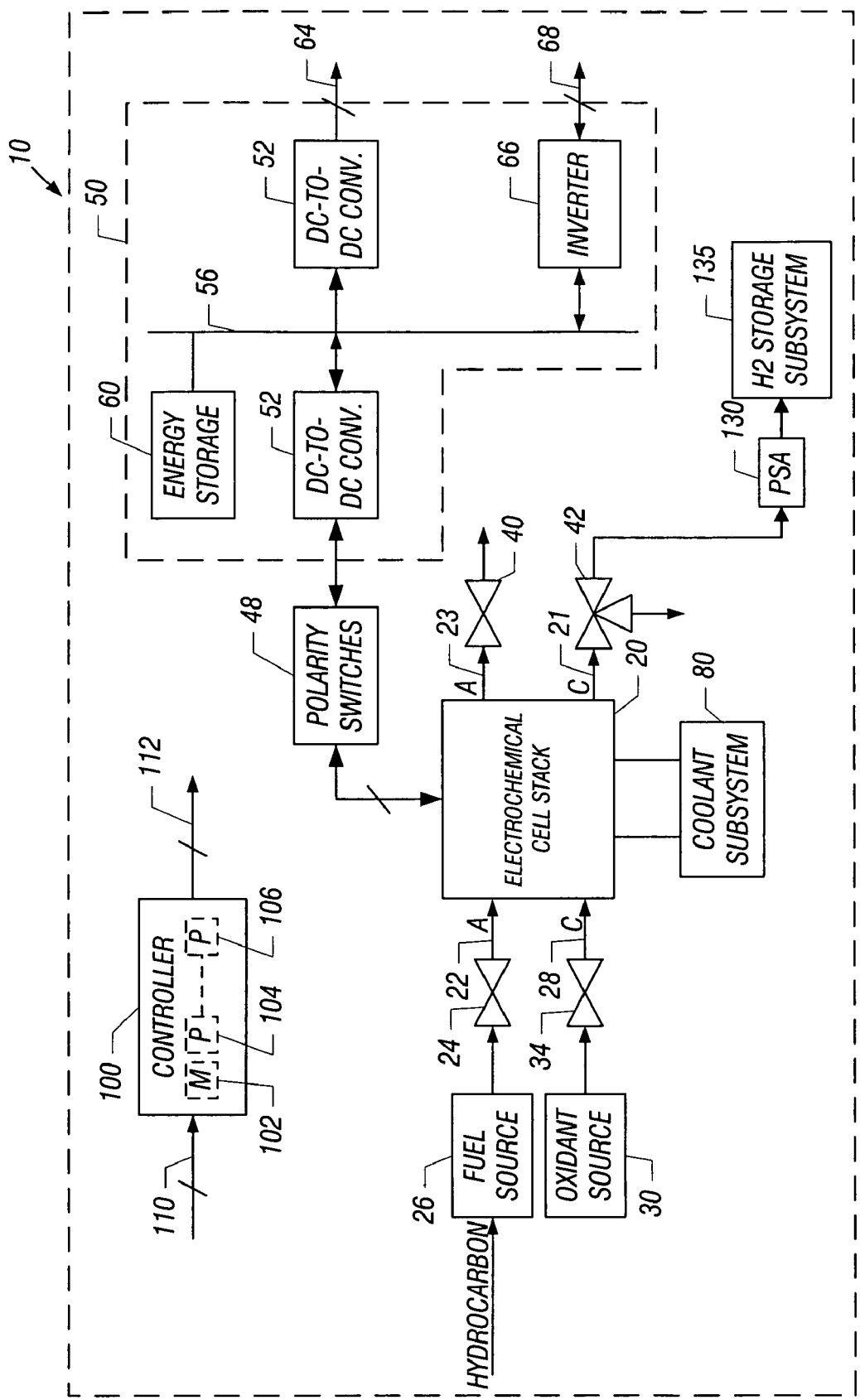
FIG. 1 is a schematic diagram of an electrochemical cell system according to an embodiment of the invention.

Referring to FIG. 1, an electrochemical cell system 10 (a residential energy station, for example) in accordance with embodiments of the invention includes a dual mode electrochemical cell stack 20 that functions in one of two modes: a power producing mode in which the stack 20 functions as a fuel cell stack to produce electrical power; and a pumping mode in which the stack 20 functions as an electrochemical pump to purify an incoming flow (a reformate flow, for example) to produce a relatively purified fuel flow (a relatively pure hydrogen fuel flow, for example). As described herein, the electrochemical cell system 10 uses a technique to transition the stack 20 between the power producing and pumping modes in a significantly short time interval.

In the power producing mode, the electrochemical cell stack 20 receives an incoming fuel flow at its anode inlet 22. As an example, the incoming fuel flow may be a reformate flow (about fifty percent hydrogen, for example), which is furnished by a fuel processor 26. As a more specific example, the fuel processor 26 may receive an incoming hydrocarbon flow (a liquefied petroleum gas or natural gas flow, as examples), and the fuel source 26 reforms the hydrocarbon flow to produce an incoming fuel flow (i.e., reformats) to the stack 20, which is received at the anode inlet 22. In general, the fuel flow is communicated from the anode inlet 22 through the serpentine flow channels of the anode chamber of the stack 20 to promote electrochemical reactions pursuant to Eqs. 1 and 2; and the fuel flow produces a corresponding anode exhaust flow at an anode outlet 23 of the stack 20. As examples, the anode exhaust may be partially routed back to the anode inlet 22, may be vented to ambient, may be routed to a flare or oxidizer, etc., depending on the particular embodiment of the invention. As another example, the anode chamber may be closed off, or "dead ended" (also called "dead headed") except for possibly a bleed or purge flow during the power producing mode. Thus, many variations are contemplated and are within the scope of the appended claims.

The stack 20 also receives an incoming oxidant flow at a cathode inlet 28. In this regard, an oxidant source 30 (an air compressor or blower, as examples) may furnish an air flow that serves as the incoming oxidant flow to the stack 20. The incoming oxidant flow is routed through the serpentine flow channels of the cathode chamber of the stack 20 for purposes of promoting the electrochemical reactions (see Eqs. 1 and 2) inside the stack 20 to produce electrical power. The oxidant flow through the cathode chamber produces a cathode exhaust flow, which appears at a cathode outlet 21 of the stack 20.

As depicted in FIG. 1, the electrochemical cell system 10 may include valves 24 and 34, which are operated by a system controller 100 for purposes of controlling the incoming fuel and oxidant flows, respectively, to the fuel cell stack 20. Additionally, the electrochemical cell system 10 may include valves 40 and 42, which are operated by the controller 100 for purposes of controlling external communication with the anode outlet 23 and cathode outlet 21, respectively, of the stack 20. As further described below, during the transition between the power producing and pumping modes, the controller 100 operates the valves 34 and 42 to isolate the cathode chamber of the stack 20 from any additional oxidant flow.

During the pumping mode, the controller 100 closes off the valve 34 and opens the valves 24, 40 and 42 for purposes of allowing reformate from the fuel source 26 to flow through the anode chamber of the stack 20. In this mode of operation, the stack 20 receives electrical power (as further described below) and promotes electrochemical reactions to cause the migration of hydrogen ions across the cell membranes of the stack 20 to produce purified hydrogen, which appears as an exhaust flow at the cathode outlet 21.

The electrochemical cell system 10 includes a power conditioning subsystem 50 that, during the power producing mode of the stack 20, receives electrical power from the stack 20 and conditions the power into the appropriate form for the loads of the system 10. In this regard, the loads may include auxiliary loads of the electrochemical cell system 10, as well as external loads (residential or commercial AC or DC loads, as examples) and possibly an AC power grid.

During the pumping mode, the power conditioning subsystem 50 provides electrical power to the stack 20. The origin of this electrical power may be the AC power grid, energy that is stored in energy storage 60 (a battery bank, for example) or another source of power.

In accordance with some embodiments of the invention, the power conditioning subsystem 50 includes a DC-to-DC converter 52, which, during the power producing of the stack 20, converts the DC stack voltage into a voltage level for a power bus 56. The energy storage 60 is coupled to the bus 56, and during the power producing mode of the stack 20, power is transferred via the bus 56 to store energy in the energy storage 60. During the pumping mode, the converter 52 communicates power from the bus 56 to the stack 20 by converting the voltage level of the bus 56 into the appropriate DC stack level for promoting the pumping and achieving the desired stack current.

As also depicted in FIG. 1, the power conditioning subsystem 50 may include additional components for purposes of conditioning the power from the bus 56 into the appropriate form for the loads of the system 10. More specifically, the power conditioning subsystem 50 may include another DC-to-DC converter 62, which converts the voltage of the bus 56 into the appropriate voltage or voltages (which appear on output lines 64) for auxiliary and external loads of the system 10.

In some embodiments of the invention, the power conditioning subsystem 50 may include an inverter 66, which converts the DC voltage from the power bus 56 into one or more AC voltages (that appear on terminals 68) for external AC loads, auxiliary AC loads and/or possibly the AC power grid. For the pumping mode, the inverter 66 may deliver power from the AC grid by communicating an AC signal received at the terminal 68 into the appropriate voltage level for the bus 56.

Among the other features of the electrochemical cell system 10, the system 10 may include a hydrogen storage subsystem 135 that stores hydrogen that is produced by the stack 20 during the pumping mode. More specifically, during the pumping mode, the cathode exhaust may be routed through a pressure swing absorber (PSA) 130, which removes impurities from the cathode exhaust to further purify the hydrogen stream. The hydrogen storage subsystem 135 is connected to the outlet of the PSA 130.

The system 10 may also include polarity switches 48, which are coupled between the stack 20 and the power conditioning subsystem 50 for purposes of ensuring that the appropriate polarity exists between the terminals of the stack 20 and the power conditioning subsystem 50. In this regard, the polarity switches 48 operate to reverse the polarity of the stack terminals between the power producing and electrochemical cell pumping modes of the stack 20.

Among its other features, in accordance with some embodiments of the invention, the electrochemical cell system 10 may also include a coolant subsystem 80, which communicates a coolant through the stack's coolant channels for purposes of regulating the stack temperature.

As also shown in FIG. 1, the system controller 100 may include a processor 106 (representative of one or more microprocessors and/or microcontrollers), which executes instructions 104 that are stored in a memory 102 for purposes of controlling the various aspects of the system 10. In this regard, the controller 100 may include various output terminals 112 for purposes of regulating operation of the fuel processor 26; opening and closing valves (such as the valves 24, 28, 40 and 42, as examples); operating various motors (such as a motor of the oxidant source 30; for example), controlling the power mode to pumping mode transition, as described in more detail below; regulating operation of the converters 52 and 62; regulating operation of the inverter 66; etc., as just a few examples. The controller 100 also includes various input terminals 110 for purposes of monitoring sensed conditions, voltages and/or currents of the system 10, as well as receiving commands and other information for purposes of controlling operations of the system 10.

It is noted that the electrochemical system 10 depicted in FIG. 1 is merely for purposes of an example, as the depicted features of the system have been simplified for purposes of clarifying the certain aspects of the invention, which are described herein. Other variations of the system 10 are contemplated and are within the scope of the appended claims.

Figure 2:
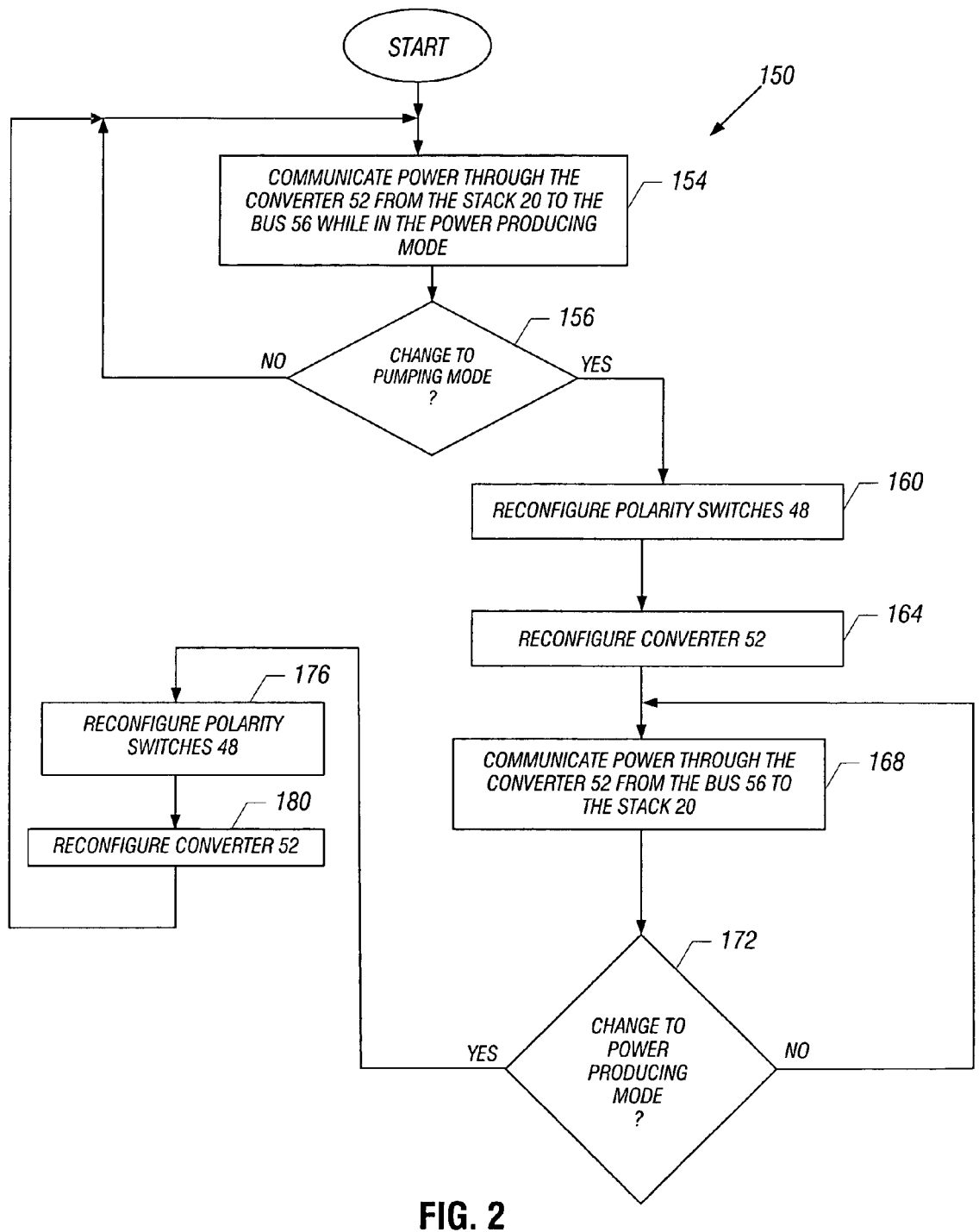
FIG. 2 is a flow diagram depicting the use of a dual function DC-to-DC converter according to an embodiment of the invention.

Referring to FIG. 2 in conjunction with FIG. 1, in accordance with embodiments of the invention, a technique 150 may be used for purposes of configuring the powering conditioning subsystem 50 based on the mode of the stack 20. For this example, the technique 150 is assumed to begin in block 154 in which the stack 20 is in the power producing mode. In this mode, power is communicated through the DC-to-DC converter 52 from the stack 20 to the bus 56, and the converter 52 operates as a boost converter. When a mode change is to occur (as indicated in diamond 156), the controller 100 reconfigures the load conditioning subsystem 50 for the pumping mode. More specifically, the controller 100 operates the polarity switches 48 to reverse the polarity of the terminals of the stack 20; and subsequently, the controller 100 reconfigures (block 164) the DC-to-DC converter 52 for operation in the reverse direction as a Buck converter. Power is then communicated, pursuant to block 168, through the converter 52 from the bus 56 to the stack 20.

When a mode change is to occur again (as depicted in diamond 172), the controller 100 once again reconfigures the converter 52 accordingly. In this regard, the controller 100 reconfigures (block 176) the polarity switches 48 to reverse the polarity of the stack terminals for the power producing mode and reconfigures (block 180) the converter 52 for a power flow from the stack 20 to the bus 56 such that the converter 52 operates as a boost converter. After this reconfiguration, control returns to block 154, where power is communicated through the converter 52 from the stack 20 to the bus 56 while the stack 20 is in the power producing mode.

Figure 3:
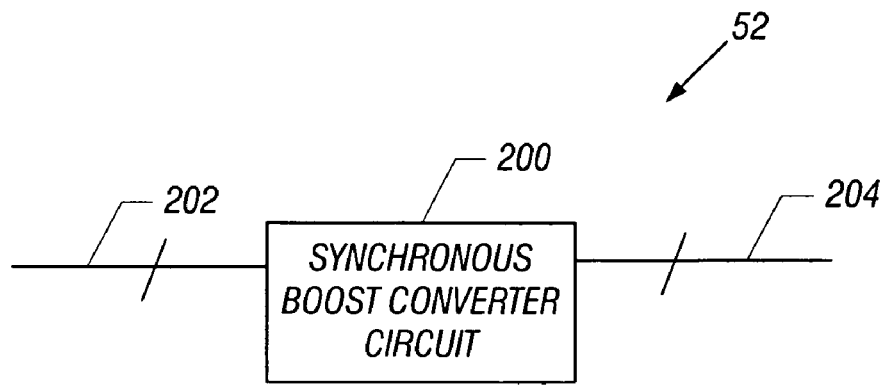
FIGS. 3, 4 and 7 are schematic diagrams of DC-to-DC converters according to embodiments of the invention.

Referring to FIG. 3, in accordance with some embodiments of the invention, the DC-to-DC converter 52 may include terminals 202 that are coupled to the stack 20 and terminals 204 that are coupled to the bus 56. The converter 52 may be, as a non-limiting example, a synchronous boost converter 200, which is capable of functioning as a boost converter in a power flow direction from the terminals 202 to the terminals 204 and is also capable of functioning as a Buck converter in a power flow direction from the terminals 204 to the terminals 202.

Figure 4:
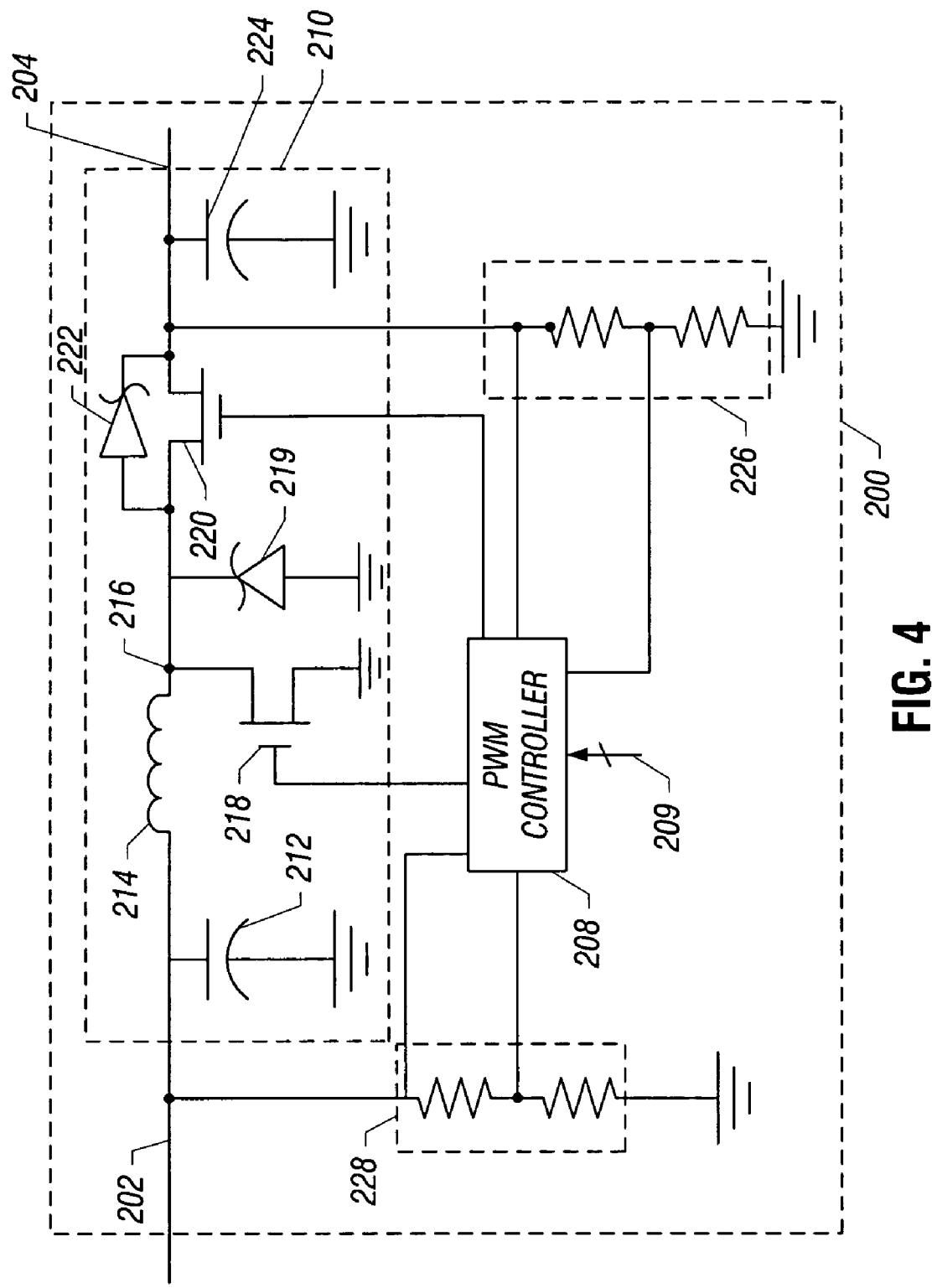

As a more specific example, FIG. 4 depicts a schematic diagram of the synchronous boost converter 200 in accordance with some embodiments of the invention. In general, for this example, one of the terminals 202 is coupled to ground, and similarly, one of the terminals 204 is coupled to ground. The converter 200 includes a power stage 210, which includes an inductor 214 that is coupled between the terminal 202 and a node 216. A transistor 218 has a switched path (a drain-source path, for example) that is coupled between the node 216, and ground; and a transistor 220 (a MOSFET, for example) has a switched path (a metal oxide semiconductor-field-effect-transistor (MOSFET), as an example) that is coupled between the node 216 and the terminal 204. As shown in FIG. 4, capacitors 212 and 224 may be coupled between the respective terminals 202 and 204 and ground.

The cathode of a diode 219 may be coupled to the node 216, and the anode of the diode 219 may be coupled to ground; and the cathode of a diode 222 may be coupled to the terminal 204, with the anode of the diode 222 being coupled to the node 216.

The converter 200 also includes a pulse width modulation (PWM) controller 208 that provides PWM signals to control the transistors 218 and 224, depending on whether the converter 200 is operating as a Buck or boost converter. The PWM 208 controls the switches 218 and 220 (i.e., controls the duty cycles of the PWM signals) based on feedback that is obtained either through a feedback network 226 or a feedback network 228, depending on the particular mode of operation of the converter 200. The PWM controller 208 is configured by the controller 100 to operate either as a Buck converter or boost converter (i.e., to either apply a first Buck control algorithm or a second boost control algorithm) via communication lines that may be coupled to the output terminals of the controller 100.

Figure 5:
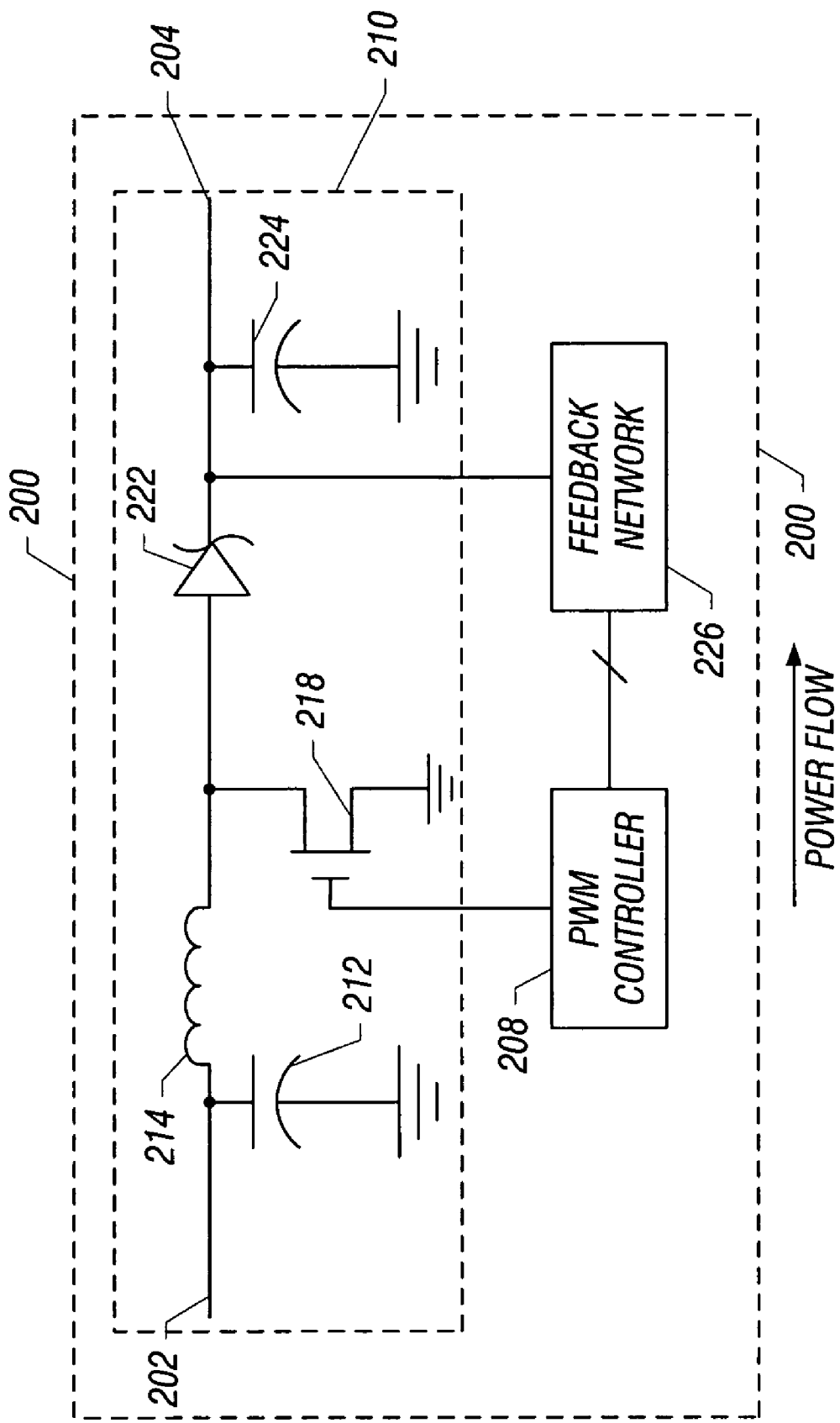
FIG. 5 is a schematic diagram illustrating the converter of FIG. 4 when operating as a boost converter according to an embodiment of the invention.

When operating as a boost converter, the PWM controller 208 controls the transistor 218 with a PWM signal and leaves the transistor 220 turned off to configure the power stage 210 as a boost converter, as depicted in FIG. 5. Thus, in this configuration, power is transferred from the terminal 202 to the terminal 204, and the PWM controller 208 bases its control on feedback that is indicated by the feedback network 226.

Figure 6:
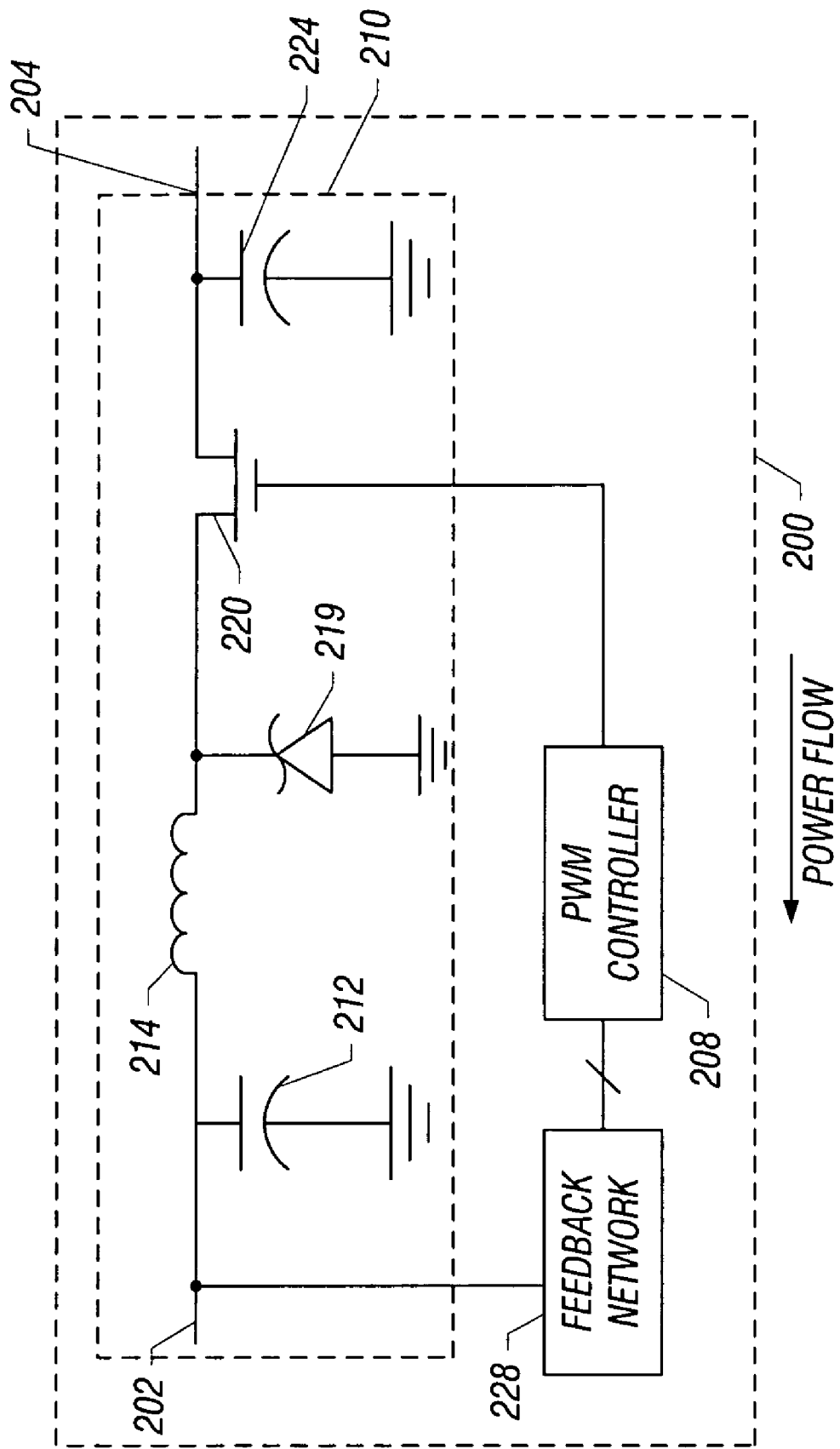
FIG. 6 is a schematic diagram illustrating the converter of FIG. 4 when operating as a Buck converter according to an embodiment of the invention.

For the Buck mode of operation, the PWM controller 208 operates the transistor 220 via a PWM signal and turns off the transistor 218 to achieve a Buck configuration for the power stage 200, as depicted in FIG. 6. For this configuration, power flows through the power stage from the terminal 204 to the terminal 202. Furthermore, the PWM controller 208 uses feedback obtained by the feedback network 228 for purposes of controlling the PWM signal.

Figure 7:
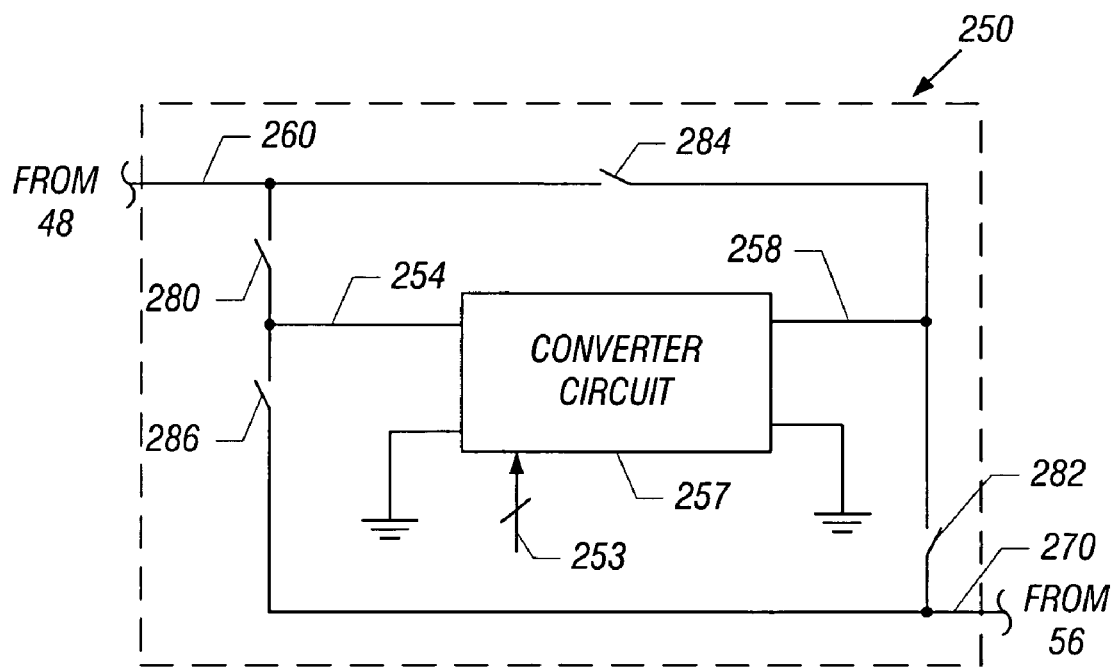

It is noted that the converter 200 is one out of many possible embodiments of a converter that may step up a voltage in one direction and step down a voltage in another direction. Thus, many other variations are contemplated and are within the scope of the appended claims. As another example, FIG. 7 depicts a converter 250 that may be used in accordance with other embodiments of the invention. The converter 250 uses a converter circuit 251, which is configured for power flow in only a single direction from an input terminal 254 of the converter circuit 251 to an output terminal 258 of the circuit 251. The converter circuit 251 may be, as an example, a Buck-Boost converter, that is capable of operating as a Buck converter in one mode of operation and operating as a boost converter in another mode of operation. The controller 100 operates the switches 280, 282, 284 and 286 to selectively connect the polarity switches 48 and bus 56 to the terminals 254 and 258 of the converter circuit 251, depending on the mode of operation of the stack 20.

As a more specific example, during the power producing mode of the stack 20, the controller 100 closes the switches 280 and 282 and opens the switches 284 and 286 to couple the polarity switches 48 to the input terminal 254 and couple the bus to the input terminal 258. During this mode of operation, the controller 100 configures a controller (not shown) of the converter 251 to operate as a boost converter (via control lines 253, for example). When the stack 20 is operated in the pumping mode, the controller 100 closes the switches 284 and 286 and opens the switches 280 and 282 for purposes of connecting the polarity switches 48 to the output terminal 258 and connecting the bus 56 to the input terminal 254. During this mode of operation, the controller 100 configures the controller of the converter circuit 251 (via the control lines 253, for example) to operate as a Buck converter.

Other variations are contemplated and are within the scope of the appended claims. For example, in accordance with some embodiments of the invention, the DC-to-DC converter 52 may have a dedicated controller, which is separate from the system controller 100 and communicates with the system controller 100 (via a serial communication link, for example) for purposes of controlling specific operations of the converter 52, such as controller the converter 52 to configure the controller 52 for the correct power flow direction and possibly generating the PWM control signals for the controller 52.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   operating a converter to convert a first voltage produced by an electrochemical cell stack in a power producing mode into a second voltage; and
   operating the converter to convert a third voltage into a fourth voltage to drive the electrochemical cell stack in a pumping mode in which the electrochemical cell stack functions as an electrochemical pump to purify an incoming flow to produce a purified fuel flow,
   wherein a polarity switch is disposed between the electrochemical cell stack and the converter to reverse a polarity of stack terminals between the power producing mode and the electrochemical cell pumping mode,
   wherein the polarity switch and the converter are disposed between the electrochemical cell stack and a bus so that when the power producing mode changes to the electrochemical cell pumping mode or vice versa, the polarity switch first reverses the polarity of the stack terminals and then the converter operates in a reverse direction.

2. The method of claim 1, wherein the act of operating the converter to convert the first voltage comprises providing the second voltage to the bus of an electrochemical cell system.

3. The method of claim 2, further comprising:
   operating an additional converter to convert the second voltage into a fifth voltage.

4. The method of claim 2, further comprising:
   communicating power from the bus to energy storage in response to the power producing mode.

5. The method of claim 1, wherein the act of operating the converter to convert the first voltage comprises providing the first voltage to a first terminal of the converter and providing the second voltage at a second terminal of the converter, and the act of operating the converter to convert the third voltage comprises receiving the third voltage at the second terminal and providing the fourth voltage at the first terminal.

6. A system comprising:
   an electrochemical cell stack;
   a converter coupled to the electrochemical cell stack; and
   a control subsystem adapted to:
      configure the converter to convert a first voltage produced by the electrochemical cell stack in a power producing mode into a second voltage; and
      configure the converter to convert a third voltage into a fourth voltage to drive the electrochemical cell stack in an electrochemical pumping mode in which the electrochemical cell stack functions as an electrochemical pump to purify an incoming flow to produce a purified fuel flow,
   wherein a polarity switch is disposed between the electrochemical cell stack and the converter to reverse a polarity of stack terminals between the power producing mode and the electrochemical cell pumping mode,
   wherein the polarity switch and the converter are disposed between the electrochemical cell stack and a bus so that when the power producing mode changes to the electrochemical cell pumping mode or vice versa, the polarity switch first reverses the polarity of the stack terminals and then the converter operates in a reverse direction.

7. The system of claim 6, wherein the second and third voltages comprise voltages of the bus.

8. The system of claim 7, further comprising:
   energy storage to receive power from the bus in response to the power producing mode.

9. The system of claim 6, further comprising:
   an additional converter to convert the second voltage into a fifth voltage.

10. The system of claim 6, wherein the converter comprises:
    a first terminal to receive the first voltage and provide the fourth voltage; and
    a second terminal to provide the second voltage and receive the third voltage.

11. The system of claim 6, wherein the converter comprises a synchronous boost converter.

12. The system of claim 6, wherein when the power producing mode changes to the electrochemical cell pumping mode, the converter is reversed to operate as a Buck converter, and when the electrochemical cell pumping mode changes to the power producing mode, the converter is reversed to operate as a boost converter.

13. The method of claim 1, wherein when the power producing mode changes to the electrochemical cell pumping mode, the converter is reversed to operate as a Buck converter, and when the electrochemical cell pumping mode changes to the power producing mode, the converter is reversed to operate as a boost converter.

14. The method of claim 13, wherein the converter functions as the boost converter in a power flow direction and as the Buck converter in an opposed power flow direction.

15. The method of claim 13, wherein the converter functions as the boost converter and the Buck converter in the same power flow direction.

* * * * *